US012183993B2

(12) United States Patent
Jen

(10) Patent No.: US 12,183,993 B2
(45) Date of Patent: Dec. 31, 2024

(54) PROXIMITY-COUPLED LOOP ANTENNA

(71) Applicant: California Eastern Laboratories, Inc., Santa Clara, CA (US)

(72) Inventor: Liang-Sywan Edward Jen, Glendale, WI (US)

( * ) Notice: Subject to any disclaimer, the term of this patent is extended or adjusted under 35 U.S.C. 154(b) by 103 days.

(21) Appl. No.: 18/099,423

(22) Filed: Jan. 20, 2023

(65) Prior Publication Data

US 2024/0250426 A1 Jul. 25, 2024

(51) Int. Cl.
*H01Q 7/00* (2006.01)
*H01Q 9/04* (2006.01)

(52) U.S. Cl.
CPC ............... *H01Q 7/00* (2013.01); *H01Q 9/045* (2013.01)

(58) Field of Classification Search
CPC ................................ H01Q 7/00; H01Q 9/045
See application file for complete search history.

(56) References Cited

U.S. PATENT DOCUMENTS

2007/0285321 A1* 12/2007 Chung .................. H01Q 5/371 343/702

* cited by examiner

*Primary Examiner* — Dieu Hien T Duong
(74) *Attorney, Agent, or Firm* — Richard W. James

(57) ABSTRACT

A proximity-coupled loop antenna. The proximity-coupled loop antenna includes a dielectric substrate, a ground plane having a direct-fed strip cut therefrom, a radio frequency port, a coupled strip cut therefrom, a first edge cut therefrom parallel the direct-fed strip and a second edge cut therefrom adjacent the first edge situated on the dielectric substrate, the first and second edges of the ground plane having a total length of approximately one-quarter wavelength of the lowest resonant frequency of the antenna and forming a conductive resonant edge.

17 Claims, 14 Drawing Sheets
(5 of 14 Drawing Sheet(s) Filed in Color)

500

PROXIMITY-COUPLED LOOP ANTENNA

BACKGROUND

Field of the Disclosure

The present disclosure generally relates to loop antennas and, more particularly, to proximity-coupled loop antennas.

Brief Description of Related Art

Radios are required to enable wireless communication. Those radios receive or transmit messages between wireless devices in various systems, including Internet of Things and control system networks and the component parts of those systems, including sensors, actuators, and controllers.

To increase throughput within an allocated spectrum, digital modulation methods have employed increased numbers of coding symbols used within a specified power bandwidth. As the number of coding symbols increases, interference generated from other devices that share the allocated spectrum degrade throughput. Recently, the FCC has allocated additional spectrum (5-7 GHz) to reduce interference and increase throughput for wireless devices.

There has also been a significant increase in the number of wireless devices in smaller form factors. Miniaturization of wireless devices requires that an antenna be compressed in order to fit within the required footprint. Unfortunately, compression of the conventional antenna structures like the monopole, inverted-F or planar inverted-F antennas tends to degrade antenna performance by narrowing usable bandwidth and decreasing radiation efficiency.

According to the Couple-fed Multi-band Loop Antenna disclosed in U.S. Pat. No. 7,978,141, miniaturization of an antenna can be achieved through the introduction of series capacitance within a loop to excite the quarter-wavelength resonant mode of the loop paired with a matching circuit. That design does not lend itself well to use on wireless modules, however, at least because of the increased profile required by the additional components required for that type of antenna.

Accordingly, there is a need for a device and method to maximize antenna operation that requires little space.

There is also a need for an antenna that does not require a matching circuit.

SUMMARY OF THE INVENTION

In one embodiment, the present disclosure contemplates a proximity-coupled loop antenna. That proximity-coupled loop antenna includes a dielectric substrate, a ground plane situated on the dielectric substrate, the ground plane having at least three edges, a direct-fed angled strip cut from the ground plane beginning at a first edge of the ground plane, one of a signal and a radio frequency port connected to the ground plane in the angled strip and an angled coupling strip cut from the ground plane, the angled coupling strip adjacent to and not connected to the angled strip, the angled coupling strip extending to the first edge of the ground plane and having a segment that is substantially parallel to a segment of the direct-fed angled strip and substantially parallel to a parallel edge of the ground plane.

In another embodiment, the present disclosure contemplates a method of capturing and transmitting radio electromagnetic waves propagating through space. That method of capturing and transmitting radio electromagnetic waves propagating through space includes attaching a signal port to an angled direct-fed radiating strip, coupling an angled coupled radiating strip, at least a portion of which is parallel to the angled direct-fed radiating strip, to the angled direct-fed radiating strip, and creating a capacitance between the angled direct-fed radiating strip and a conductive edge parallel to at least a portion of the angled direct-fed radiating strip.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For the present disclosure to be easily understood and readily practiced, the present disclosure will now be described for purposes of illustration and not limitation, in connection with the following figures.

Figure 1:
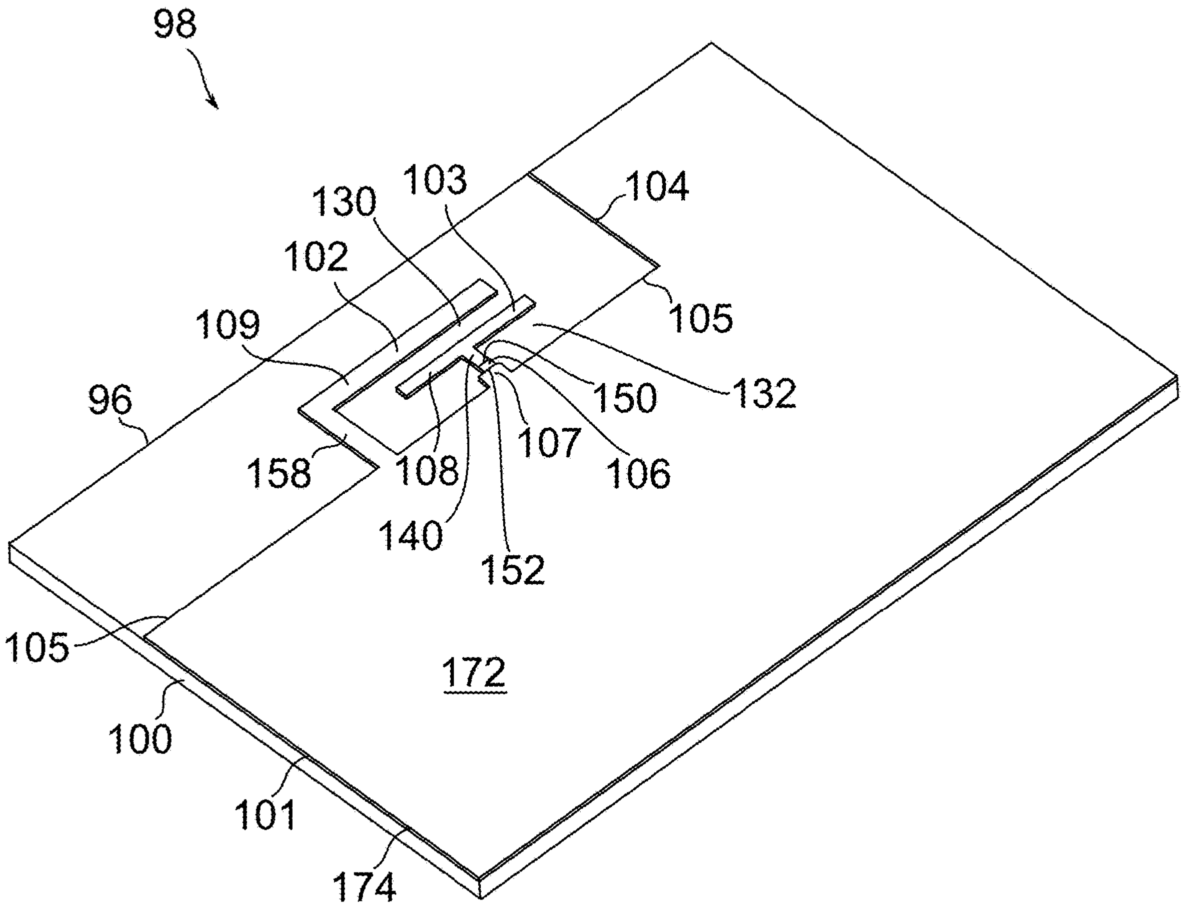

The accompanying drawings, wherein like reference numerals are employed to designate like components, are included to provide a further understanding of the present inventions, are incorporated in and constitute a part of this specification, and show embodiments of those apparatuses and methods that together with the description serve to explain those apparatuses and methods.

Figure 2:
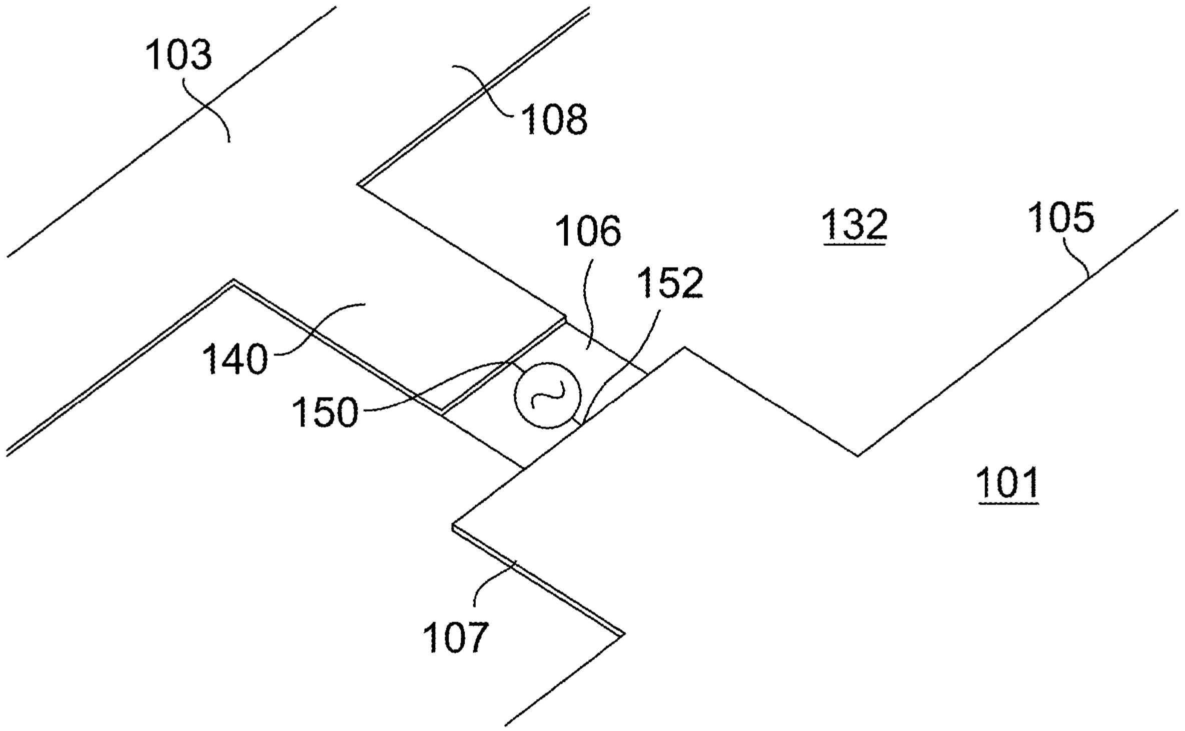

Various other objects, features and advantages of the invention will be readily apparent according to the following description exemplified by the drawings, which are shown by way of example only, wherein:

FIG. 1 illustrates an embodiment of an antenna of the present invention;

FIG. 2 illustrates a close-up view of the intersection of the ground plane and the angled coupled radiating strip of the antenna illustrated in FIG. 1.

Figure 3:
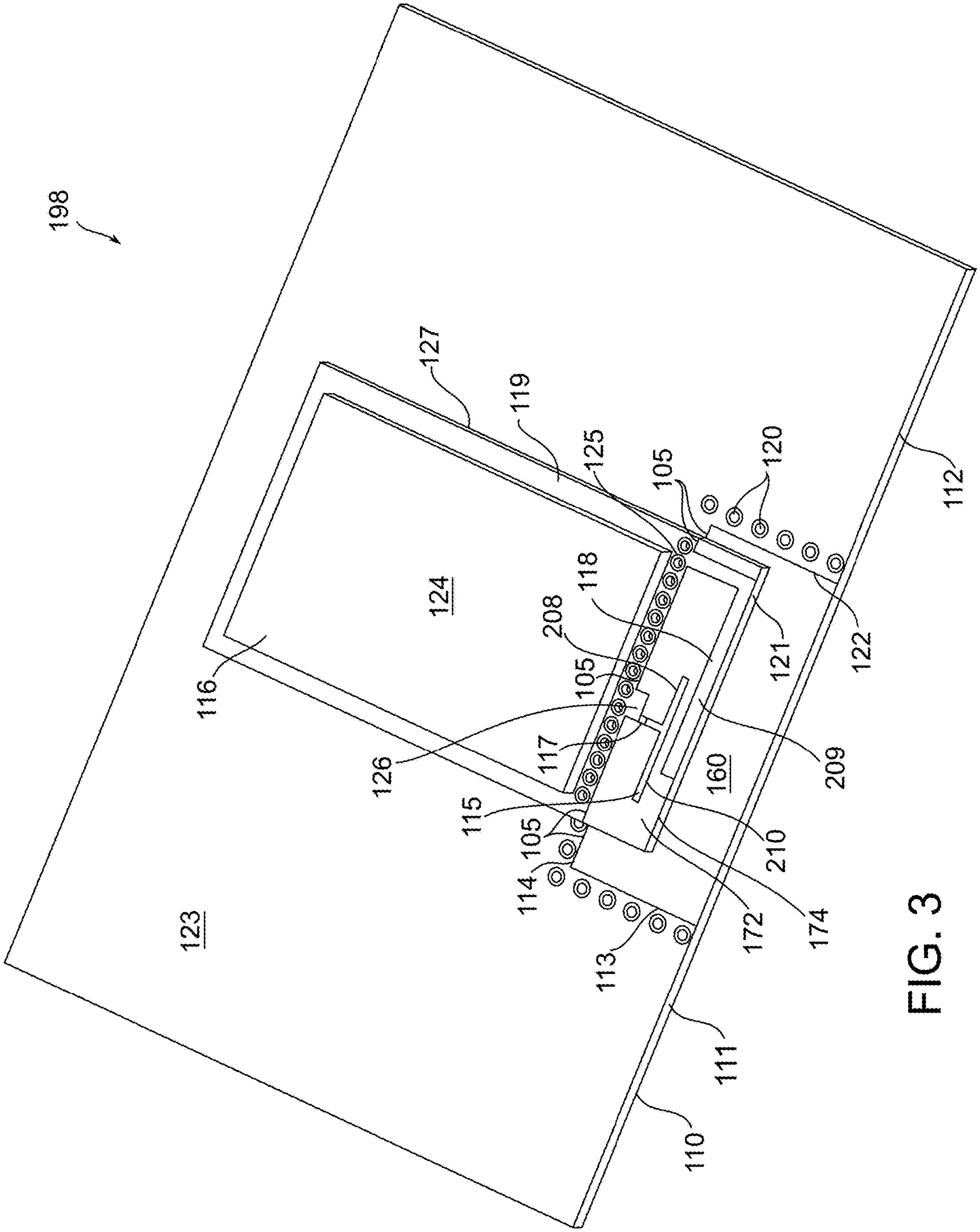
Figure 4:
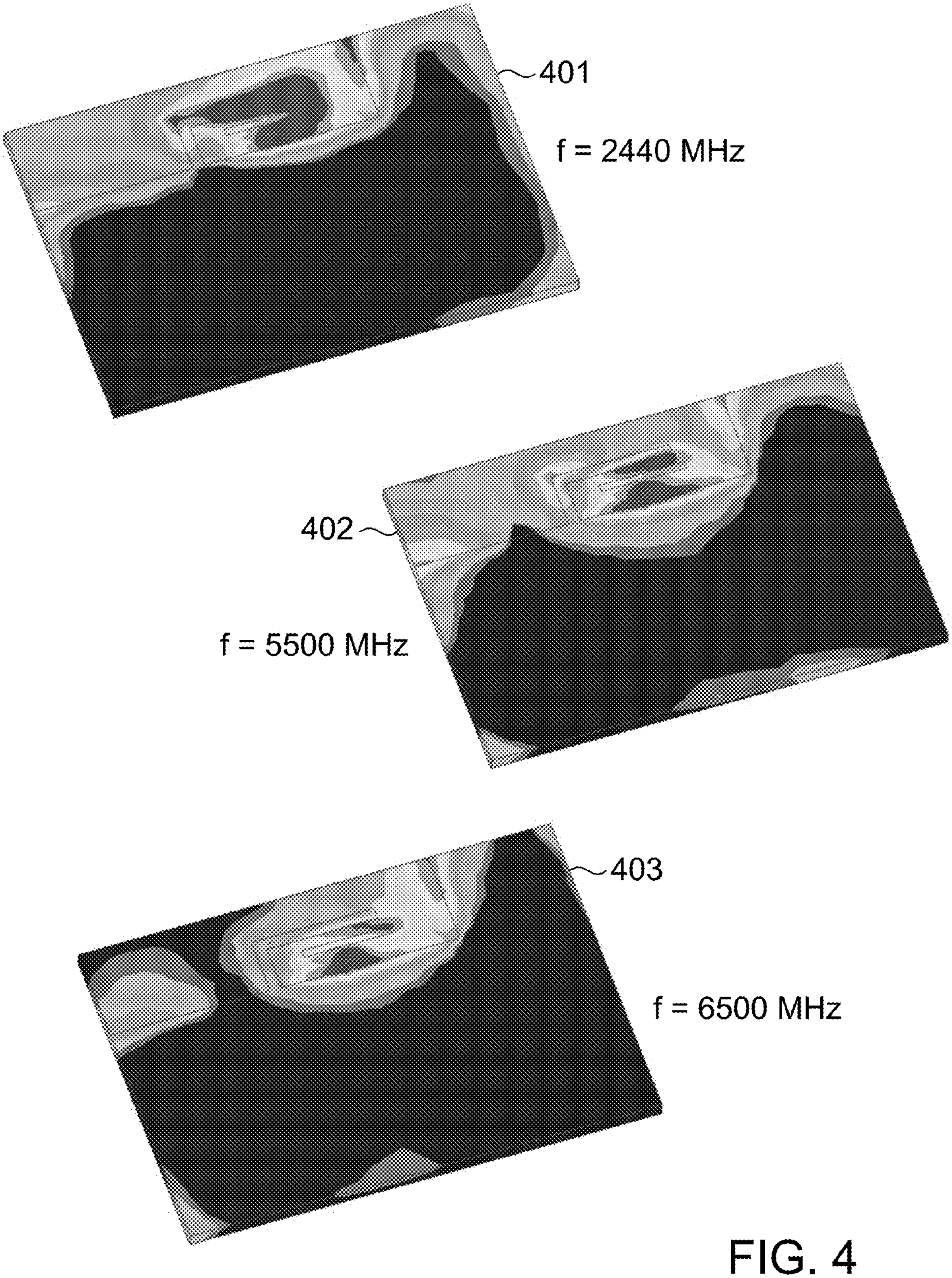
Figure 5:
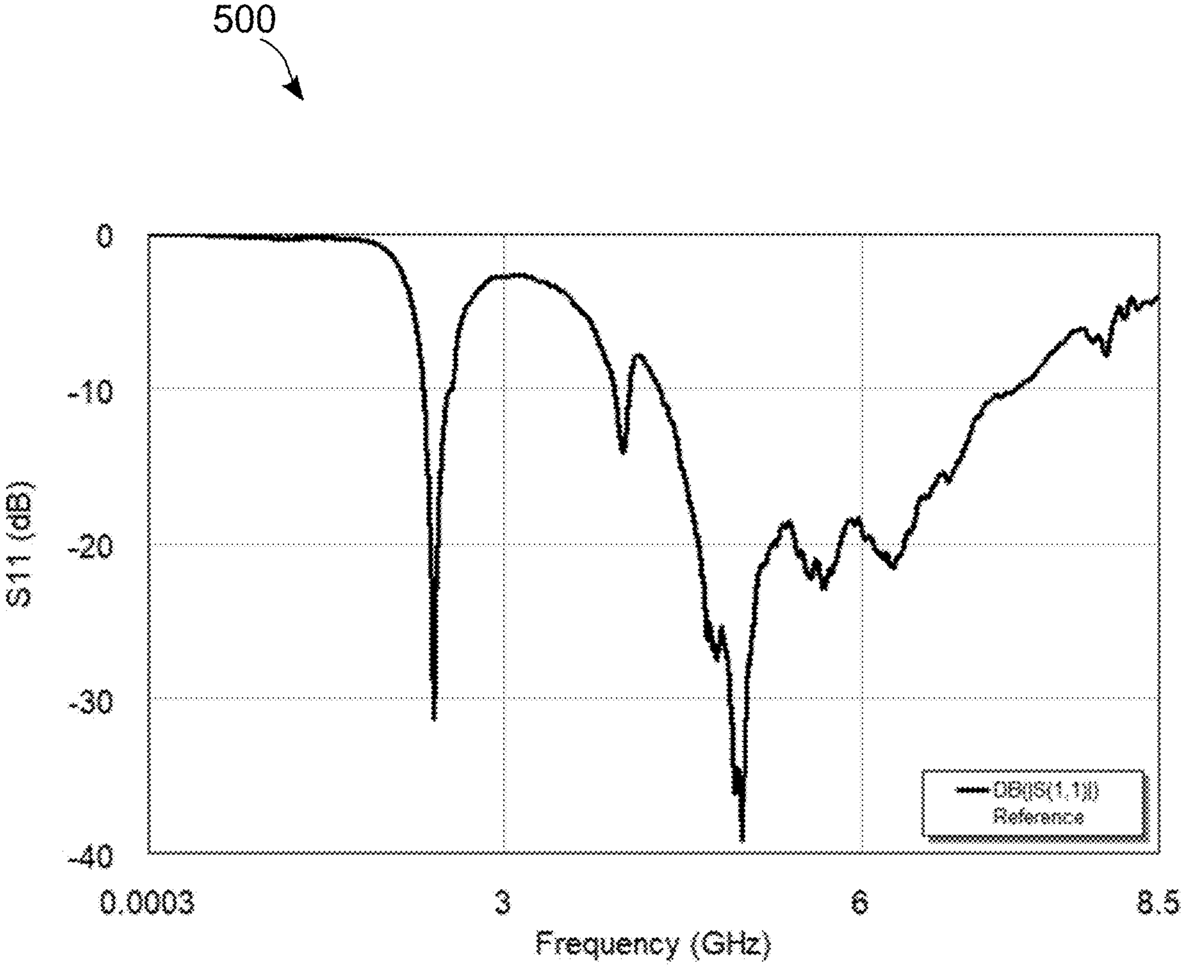
Figure 6:
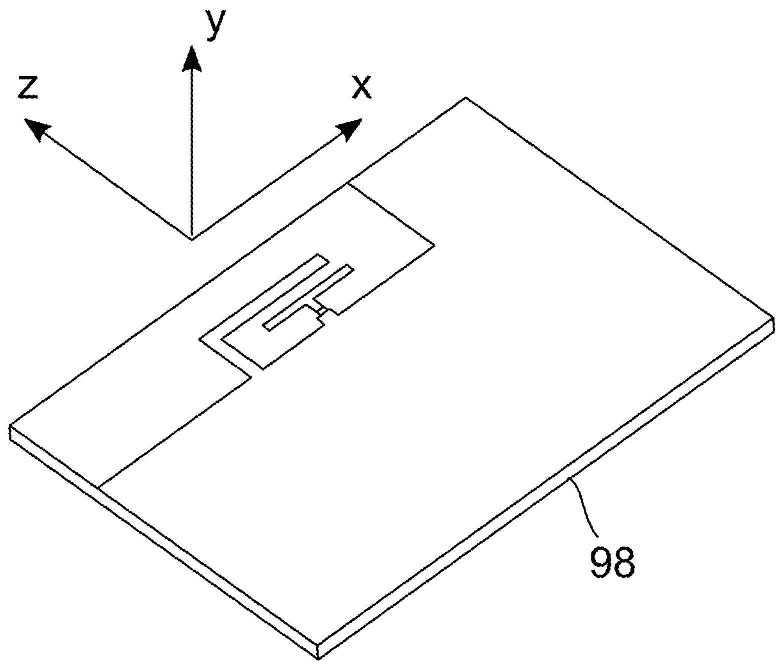
Figure 7:
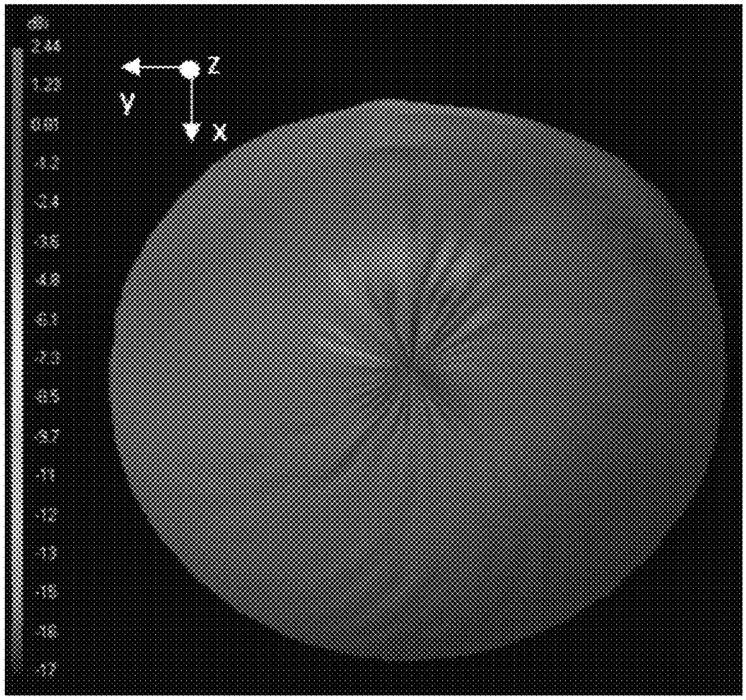
Figure 8:
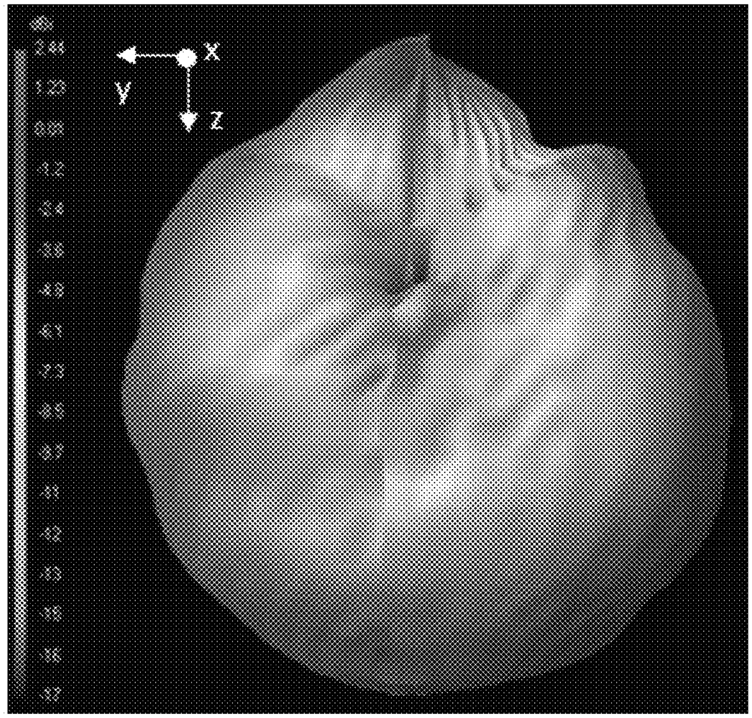
Figure 9:
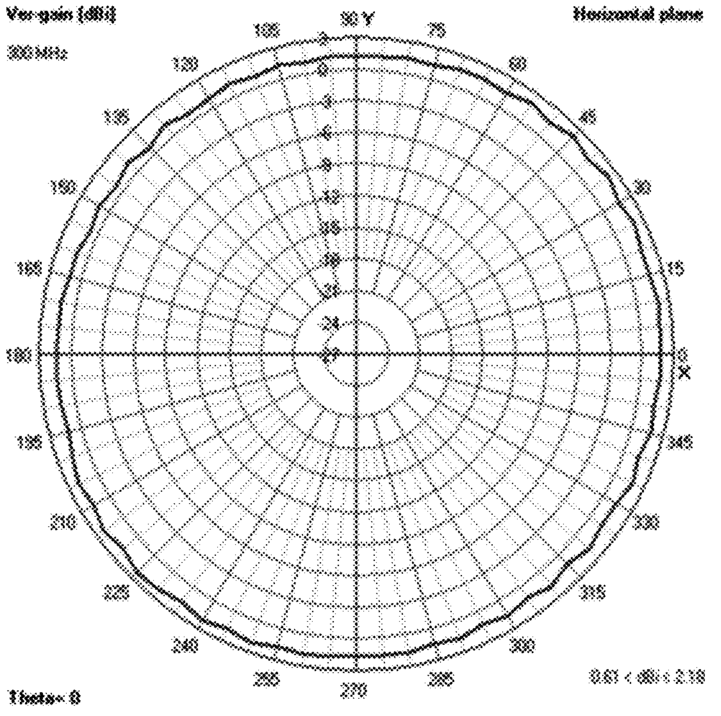
Figure 10:
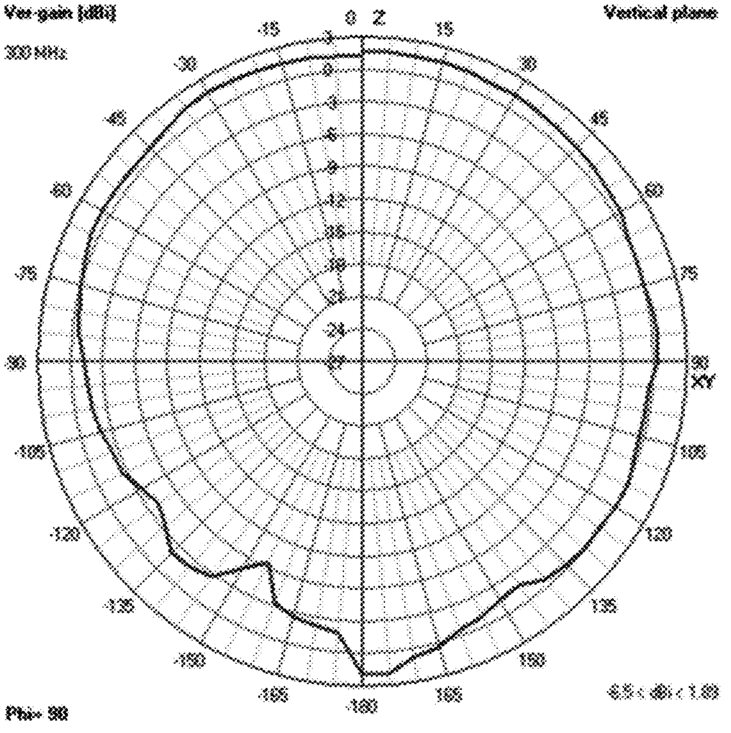
Figure 11:
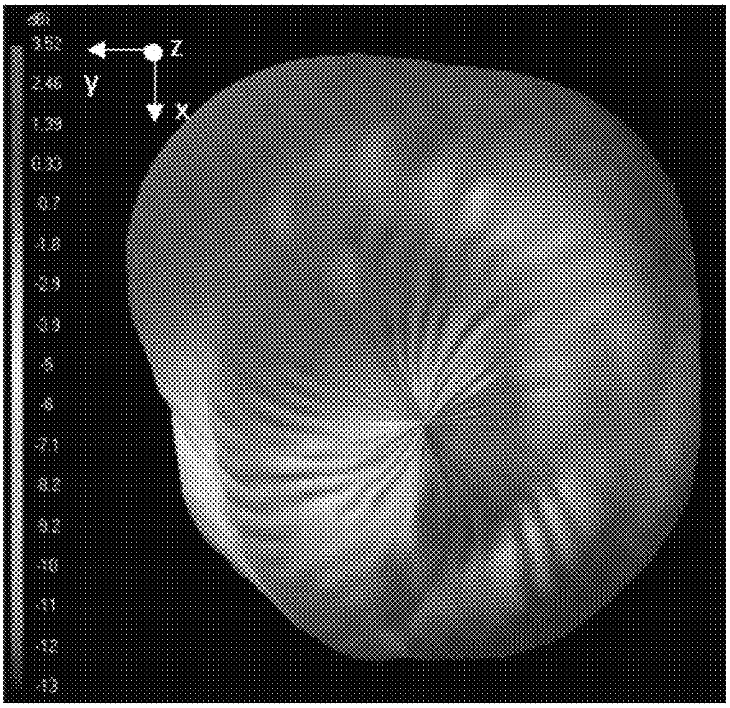
Figure 12:
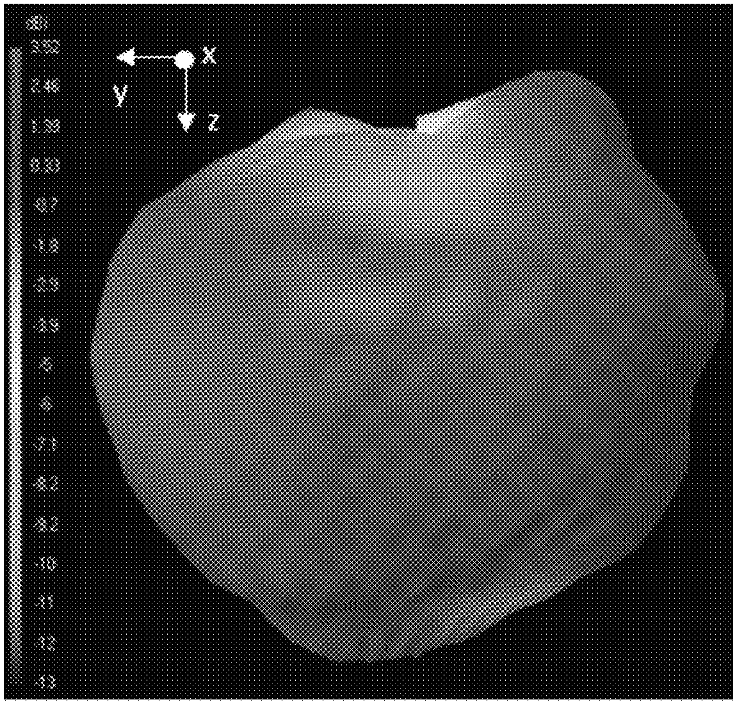
Figure 13:
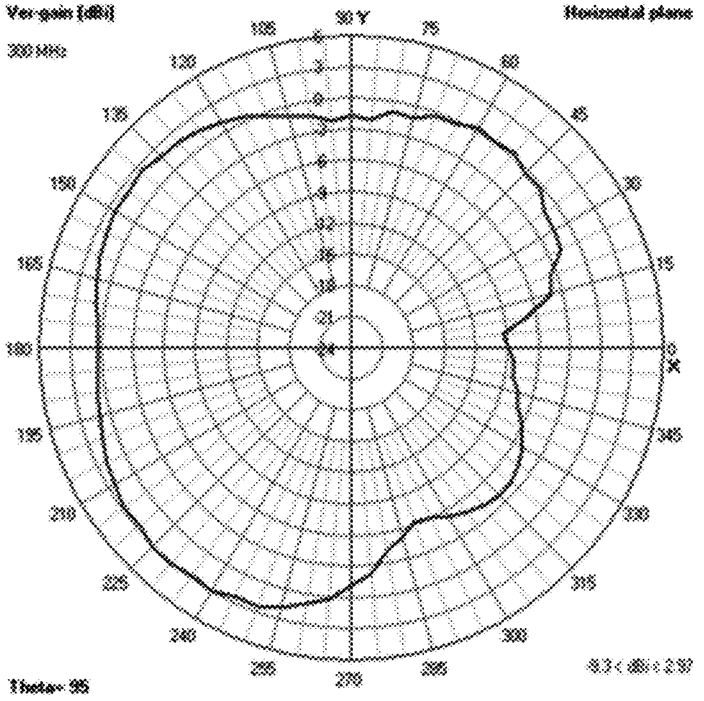
Figure 14:
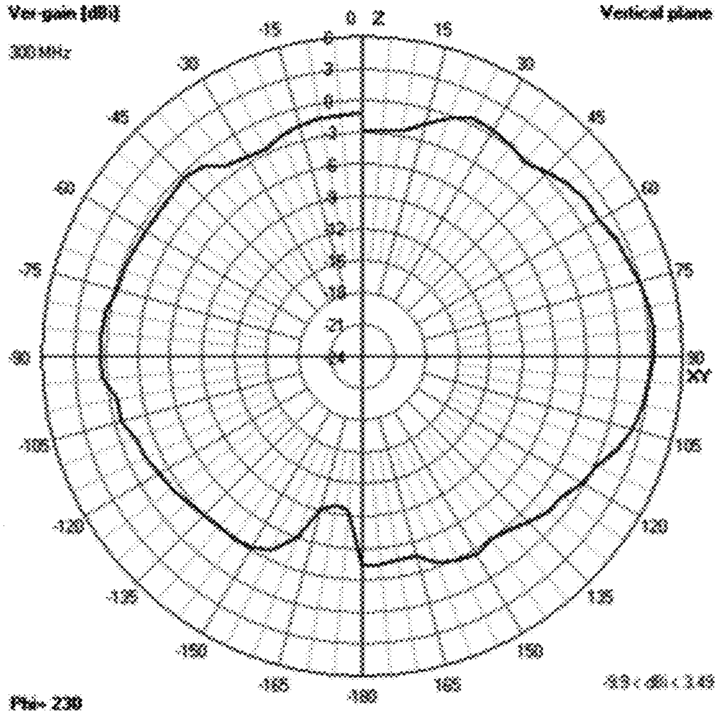
Figure 15:
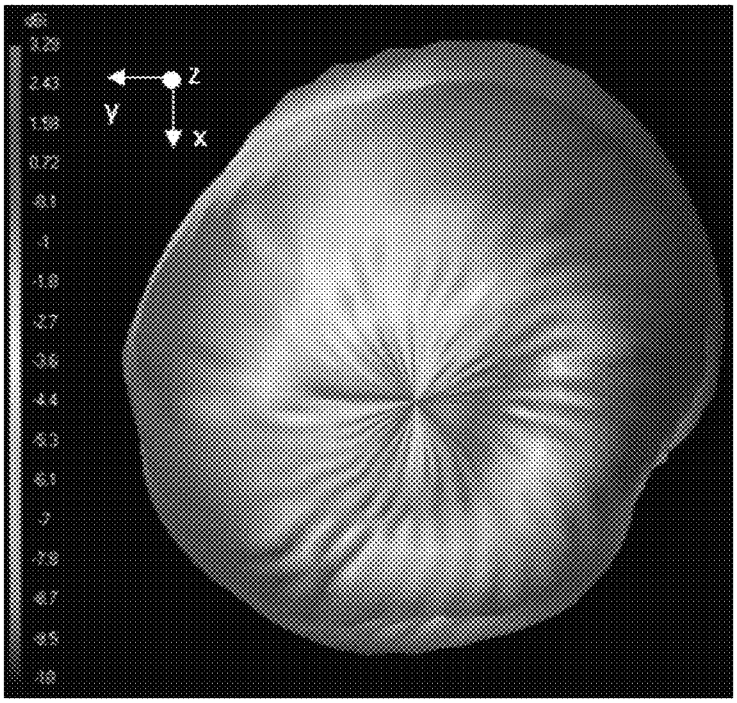
Figure 16:
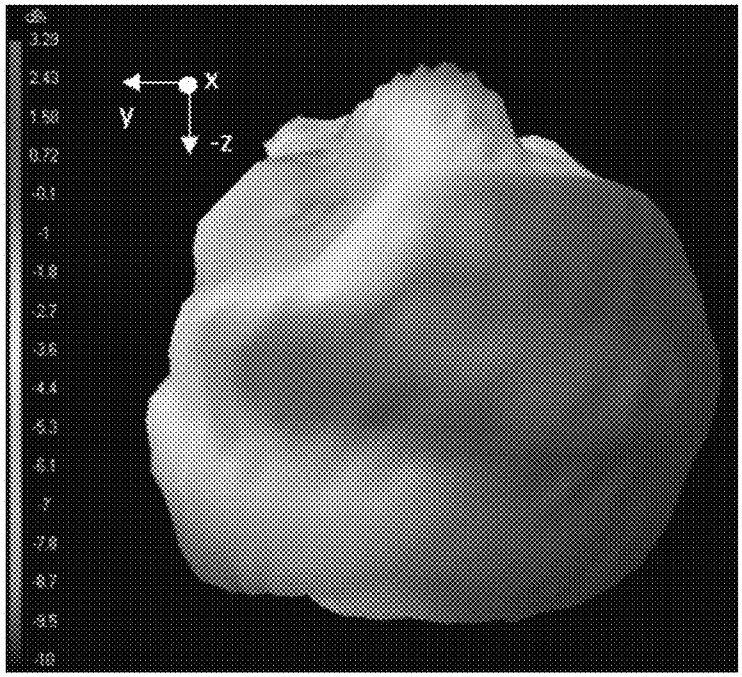
Figure 17:
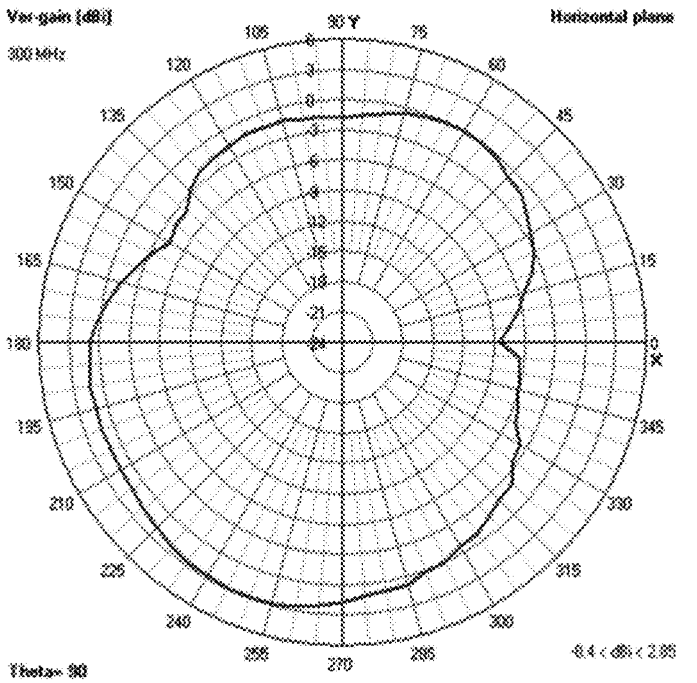
Figure 18:
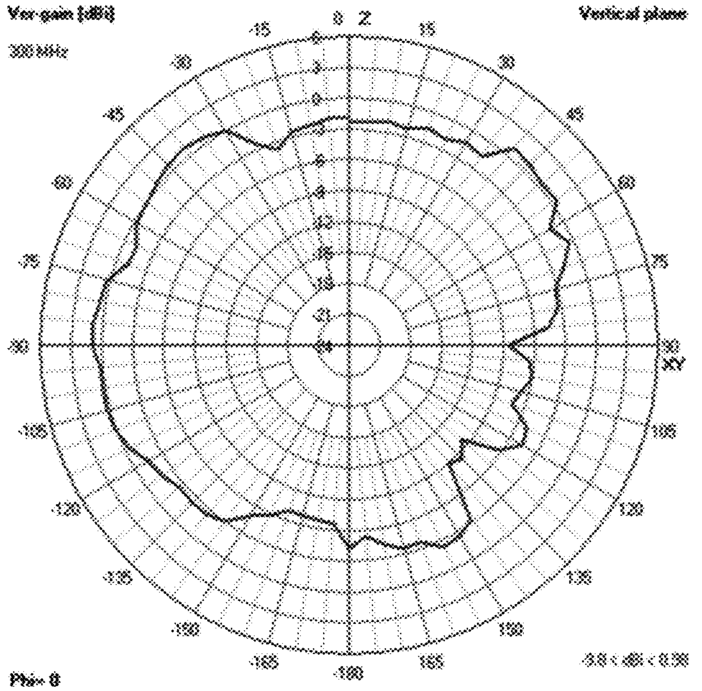
Figure 19:
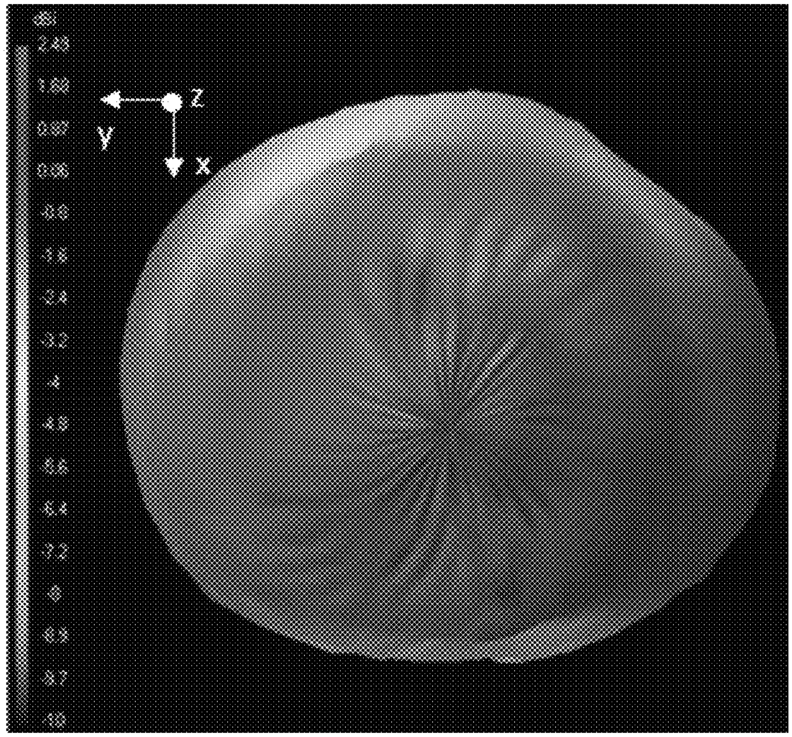
Figure 20:
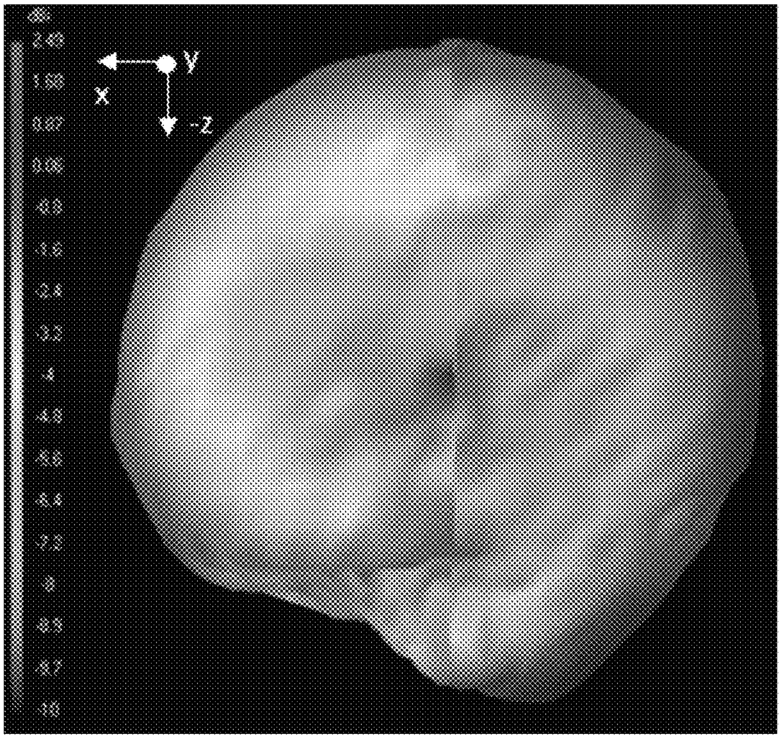
Figure 21:
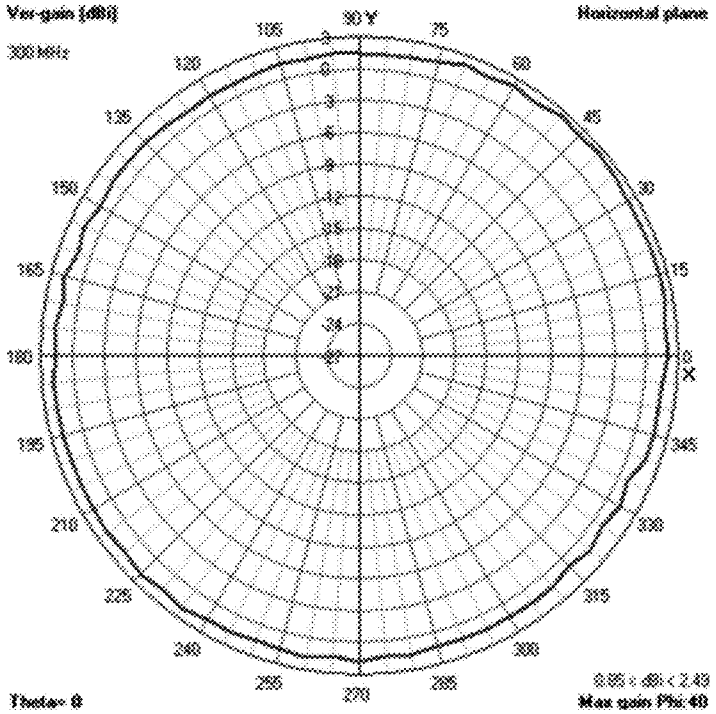
Figure 22:
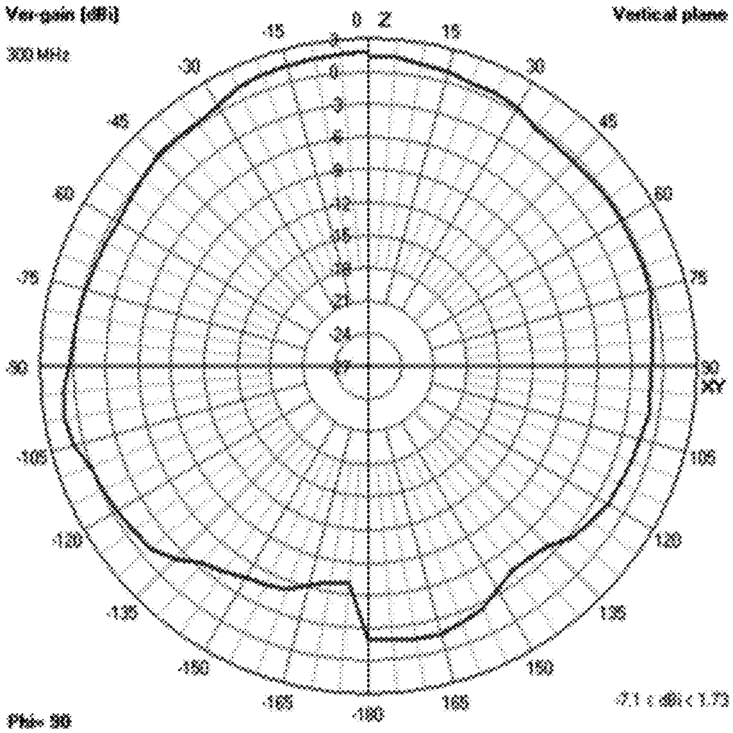

FIG. 3 illustrates another embodiment of an antenna of the present invention;

FIG. 4 is a graphical representation of the magnitude of the simulated electric-field of the embodiment of the antenna illustrated in FIG. 1 at 2440, 5500 and 6500 MHz;

FIG. 5 illustrates measured return loss for the embodiment of the antenna in shown in FIG. 3;

FIG. 6 illustrates the x, y and z unit vectors used to describe the orientation of the antenna in relation to its radiation pattern as referred to in figures that follow;

FIG. 7 illustrates a measured three-dimensional boresight view radiation pattern looking into the +z direction (referring to the x, y, and z unit vectors illustrated in FIG. 6) of the embodiment of the antenna in shown in FIG. 3 when excited at 2440 MHZ;

FIG. 8 illustrates a measured three-dimensional broadside view radiation pattern looking into the +x direction (referring to the x, y, and z unit vectors illustrated in FIG. 6) of the embodiment of the antenna in shown in FIG. 3 when excited at 2440 MHZ;

FIG. 9 illustrates a measured horizontal polarization plane slice of the boresight view illustrated in FIG. 7;

FIG. 10 illustrates a measured vertical polarization plane slice of the broadside view illustrated in FIG. 8;

FIG. 11 illustrates a measured three-dimensional boresight view radiation pattern looking into the +z direction (referring to the x, y and z unit vectors illustrated in FIG. 6) of the antenna embodiment illustrated in FIG. 3 when excited at 5400 MHZ;

FIG. 12 illustrates a measured three-dimensional broadside radiation pattern looking into the +x direction (referring to the x, y and z unit vectors illustrated in FIG. 6) of the antenna embodiment illustrated in FIG. 3 when excited at 5400 MHz;

FIG. 13 illustrates a measured vertical polarization plane slice of the boresight view illustrated in FIG. 11;

FIG. 14 illustrates a measured horizontal polarization plane slice of the broadside view illustrated in FIG. 12;

FIG. 15 illustrates a measured three-dimensional boresight view of the radiation pattern looking into the +z direction (referring to the x, y and z unit vectors illustrated in FIG. 6) of the antenna embodiment illustrated in FIG. 3 when excited at 6000 MHz;

FIG. 16 illustrates a measured three-dimensional broadside view radiation pattern looking into the +x direction (referring to the x, y and z unit vectors illustrated in FIG. 6) of the antenna embodiment illustrated in FIG. 3 when excited at 6000 MHz;

FIG. 17 illustrates a measured horizontal polarization plane slice of the boresight view illustrated in FIG. 15;

FIG. 18 illustrates the measured vertical polarization plane slice of the broadside view illustrated in FIG. 16;

FIG. 19 illustrates a measured three-dimensional boresight view radiation pattern looking into the +z direction (referring to the x, y and z unit vectors illustrated in FIG. 6) of the antenna illustrated in FIG. 3 when excited at 7000 MHz;

FIG. 20 illustrates a measured three-dimensional broadside view radiation pattern looking into the +y direction (referring to the x, y and z unit vectors illustrated in FIG. 6) of the antenna illustrated in FIG. 3 when excited at 7000 MHz;

FIG. 21 illustrates a measured horizontal polarization plane slice of the boresight view illustrated in FIG. 19; and FIG. 22 illustrates a measured vertical polarization plane slice of the broadside view illustrated in FIG. 20.

DETAILED DESCRIPTION OF THE INVENTION

Reference will now be made in detail to certain embodiments of the present disclosure, examples of which are illustrated in the accompanying figures. It is to be understood that the figures and descriptions of the present disclosure included herein illustrate and describe elements that are of particular relevance to the present disclosure, while eliminating, for the sake of clarity, other elements found in typical radios.

Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term.

FIG. 1 illustrates an embodiment of a proximity-coupled loop antenna 98. The proximity-coupled loop antenna 98 in that embodiment includes a dielectric substrate 100 and a ground plane 101 situated on the dielectric substrate 100. The ground plane 101 has an angled direct-fed radiating strip 103 that extends from the ground plane 101 beginning at a port 106 that extends from a first edge 105 of the ground plane 101 and the ground plane also has an angled coupled radiating strip 102 that extends from the ground plane 101 beginning at the first edge 105 of the ground plane 101.

The angled coupled strip 102 is adjacent to and not connected to the angled direct-fed strip 103. The angled coupled strip 102 has a first end segment 109 that is parallel to a segment 108 of the angled direct-fed strip 103 and a second end 158 that is shorted to the ground plane 101. The angled direct-fed strip 103 may be variously shaped in its assorted configurations and may, for example, be cut in a T-shape with the bottom post of the T extending to a port 106 situated along the first edge 105 of the ground plane 101 or, alternatively, the angled direct-fed strip may be in an L-shape with an end of a segment of the L extending to the port 106 along the ground plane 101.

The first edge 105 of the ground plane 101 may furthermore be substantially parallel to a segment 108 of the direct-fed angled strip 103 and also substantially parallel to a segment 109 of the coupled radiating strip 102. The first edge 105 may extend both along a surface 172 of the ground plane 101 and along a depth 174 that may run along a thickness of the ground plane 101. That depth 174 may extend perpendicularly or otherwise to the surface 172 of the ground plane 101. Thus, the first edge 105 may intersect with the angled direct-fed radiating strip 103, extend beyond the direct-fed radiating strip 103 along the surface 172 of the ground plane 101 in one, two, or more directions, and may extend perpendicularly to the surface 172 along the depth 174 of the ground plane 101, as is depicted in FIG. 2.

The ground plane 101 may be electrically conductive and may be electrically connected to ground. The parallel edge 105 may be located on or electrically tied to the ground plane 101 on a side of the angled coupled strip 102 opposite the angled direct-fed strip 103 and may create resonance that improves the performance of the antenna 98. The parallel edge 105 may increase the radiation efficiency of the direct-fed angled strip 103 and may act to effectively increase the length of the direct-fed angled strip 103.

Gaps 130 and 132 in the ground plane 101 exist between the strips 102 and 103 and between the first edge 105 of the ground plane 101 and strip 103. A radiating strip gap 130 lies between the angled direct-fed radiating strip 103 and the angled coupled radiating strip 102 and an edge gap 132 lies between the angled direct-fed strip 103 and the parallel edge 105 of the ground plane 101. The radiating strip gap 130 has a predetermined width from the angled direct-fed radiating strip 103 to the angled coupled radiating strip 102 and the radiating strip gap 130 also has a predetermined length running between the angled direct-fed radiating strip 103 and the angled coupled radiating strip 102. The edge gap 132 also has a predetermined width from the angled direct-fed radiating strip 103 to the parallel edge 105 and the radiating strip gap 130 has a predetermined length running between the angled direct-fed radiating strip 103 and the parallel edge 105. Those predetermined lengths and widths may furthermore be adjusted to tune the antenna 98 as desired.

The dielectric substrate of FIG. 1 may act as a resonator element. A raised ground stub 107 may be directly connected to the ground plane 101 and may be in contact with the angled direct-fed strip 103. At least one of a signal port, and a radio-frequency port 150 may alternatively or additionally be included in the antenna 98, and may be adjacent to the ground stub 107 and also adjacent to the angled direct-fed radiating strip 103.

In the embodiment illustrated in FIG. 1, the length of the parallel section 109 of the angled coupled strip 102 is approximately or less than one-eighth of the wavelength of the antenna's first resonant mode. In that embodiment, the length of the parallel section 108 of the coupled strip 102 is approximately one-quarter of a wavelength of the first resonant mode of the antenna 98. The length of the intersecting leg 140 that extends to the ground stub 107 that is adjacent to the first edge 105 of the ground plane 101 in the embodiment illustrated in FIG. 1 can be adjusted to tune the antenna 98 to match the antenna impedance in the 5-7 GHz band to better than 2:1 VSWR (voltage standing wave ratio). The total length of the first edge 105 of the ground plane 101 and an adjacent second edge 104 of the ground plane 101 is approximately one-quarter wavelength of the lowest resonant frequency of the antenna 98. The parallel edges 104 and 105, adjacent but not connected to the segment 108 of the direct-fed angled strip 103 and the parallel section 109 of the angled coupled strip 102 in the embodiment of FIG. 1, may serve as a quarter-wavelength transmission-line choke balun, which isolates the antenna 98 from an unbalanced feed that may exist at the signal port or the radio-frequency port 150.

A matching network is not necessary for the proximity-coupled loop antenna 98 of FIG. 1 because the dimensions of the direct-fed angled strip 103 to the coupled angled strip 102 and the proximity of the parallel edge 105 to those strips 102 and 103 and the gaps 130 and 132 between the strips 102 and 103 and between the strips 102 and 103 and the parallel edge 105 can be adjusted to achieve the desired bandwidth.

The proximity-coupled loop antenna 98 of FIG. 1 may provide a compact and wideband antenna for use on or with wireless modules to cover not only the 2.4 GHz and 5 GHz spectrums previously allocated for IEEE 802.11 (commonly referred to as "Wi-Fi") wireless communication, but also the newly allocated 6 GHz spectrum. The proximity-coupled loop antenna 98 of FIG. 1 is compact and robust for use in applications with limited space and may be tuned by adjusting the length and dimensions of the coupling segments 102 and 103 and the gaps 130 and 132

The antenna 98 may excite a quarter-wavelength loop mode through the capacitance introduced between the angled direct-fed radiating strip 103 and the parallel edge 105 acting upon the angled coupled radiating strip 102. The antenna 98 can operate with a higher or lower profile ground plane 101 as compared to that of the parallel edge 105. The antenna 98 of FIG. 1 does not appear to be particularly sensitive to metal components like capacitors or screws placed directly to the left or right of the antenna 98 footprint, which makes the antenna 98 more robust in proximity to other materials in a more compact layout. The half-wavelength and full-wavelength modes of the antenna 98 have good impedance match and wide bandwidth once the lengths of the angled radiating strips 102 and 103 and gaps between the angled radiating strips 102 and 103 and between the angled radiating strips 102 and 103 and the parallel edge 105 are properly sized and tuned. The antenna 98 of FIG. 1 can furthermore cover all three Wi-Fi bands 2.4 GHZ, 5 GHZ, and 6 GHz.

FIG. 2 illustrates a close-up view of the intersection of the ground plane 101 and the angled coupled radiating strip 102 of the antenna illustrated in FIG. 1. FIG. 2 illustrates an embodiment of the location of the signal port or the radio-frequency port 150 and also illustrates the ground terminal 152 in relation to the ground plane 101 and the angled coupled radiating strip 102 in an embodiment of the proximity-coupled loop antenna 98.

FIG. 3 illustrates another embodiment of an antenna 198 of the present invention. The embodiment illustrated in FIG. 3 includes a host board 123 and a wireless radio module 124 disposed on the host board 123. The host board 123 includes a supporting ground plane 110 supporting a dielectric substrate 111, an upper ground plane 112, and at least one host board via 120. The upper ground plane 112 has a cut-out section 160 forming a first edge 122, a second edge 114 and a third edge 113 of the upper ground plane 112.

The wireless radio module 124 is disposed on the upper ground plane 112 and the wireless radio module 124 is at least partially covered by a metal shield 116 in the embodiment illustrated in FIG. 3. The wireless radio module 124 includes a radio module supporting ground plane 127, a substrate 121, a radio module ground plane 119, at least one radio module via 125, a raised ground stub 126, a coupled-fed radiating strip 118, a direct-fed radiating strip 115, and a simulated radio-frequency (RF) port 117. A signal terminal 150 (illustrated in FIG. 2) may be connected between the radio module ground plane 119 and the direct-fed radiating strip 115. A ground terminal 152 (illustrated in FIG. 2) may be connected to the radio module ground plane 119 between the raised ground stub 126 and the simulated RF port 117.

The coupled radiating strip 118, the direct-fed radiating strip 115, the raised ground stub 126, and the simulated RF port 117 of the embodiment illustrated in FIG. 3 are located on the dielectric substrate 121 of the wireless radio module 124. The wireless radio module 124 is positioned on the host board 123 such that the bottom edge of the coupled radiating strip 118 of the wireless radio module 124 is parallel to the second edge 114 of the cut-out section 160 of the upper ground plane 112. A plurality of radio module vias 125 extend through the wireless radio module 124 in that embodiment and electrically connect the radio module ground plane 119 to the radio module supporting ground plane 127. The radio module supporting ground plane 127 of the wireless radio module 124 is electrically connected to the upper ground plane 112 on the host board 123 in that embodiment. A plurality of host board vias 120 electrically connect the upper ground plane 112 of the host board 123 to the supporting ground plane 110 of the host board 123.

The length of a parallel segment 209 of the couple-fed radiating strip 118 in the embodiment of FIG. 3 is approximately one-eighth of the wavelength of the lowest resonant frequency of the antenna 198. The length of a first parallel segment 208 of the direct-fed radiating strip 115 that is substantially parallel to the coupled radiating strip segment 209 is approximately one-quarter of the wavelength of the highest resonant frequency of the antenna 198. The length of a second parallel portion 210 of the direct-fed radiation strip 115 can be tuned to improve impedance matching for the radio module 124 to better than 2:1 VSWR in the 5-7 GHz band. The total length of the upper ground plane edges 113 and 114 is approximately one-quarter wavelength of the lowest resonant frequency of the antenna 198 and the length of upper ground plane edge 122 can be tuned to change antenna 198 radiation pattern characteristics.

In the embodiment of FIG. 3, the dielectric substrate 121 is a system circuit board of a wireless radio module 124. The radio module ground plane 119 and the supporting ground plane 127 of the wireless radio module 124 are electrically connected through a series of radio module vias 125 that run parallel to the second edge 114 of the cut-out section 160 of the host board 123. The upper ground plane 112 of the host board 123 is electrically connected to the supporting ground plane 127 of the wireless module 124 through a series of host board vias 120 that are also located along the second edge 114 of the cut-out section 160 of the host board 123. In this embodiment, the distance between the simulated RF port 117 and the intersection of upper ground plane edges 113 and 114 are approximately one-quarter wavelength of the lowest operating frequency of the radio 198. Ground planes 119 and 127 on the wireless module 124 may be formed on the wireless module 124 dielectric substrate 121 through printing or etching and host board 123 ground planes 110 and 112 may also be formed on the host board 123 dielectric substrate 111 through printing or etching. Host board 123 dielectric substrate 111 and wireless module dielectric substrate 121 may furthermore be chosen to have low loss tangents.

FIG. 4 illustrates the simulated magnitude of the electric-field distribution of the antenna 98 embodiment illustrated in FIG. 1 when excited at 2440 MHz at 401, at 5500 MHz at 402, and at 6500 MHz at 403. The greatest magnitude of electric-field in the FIG. 1 illustrations is indicated by red coloring, with orange, yellow, green, and blue indicating successively reduced magnitudes of electric-field around the antenna 98. Darker blue further indicates a lesser magnitude of electric-field than lighter blue. The resulting magnitude of the electric-field distribution of that embodiment confirms that there is capacitive coupling between the direct-fed strip 103 and the coupled-fed radiating strip 102. The resulting magnitude of the electric-field distribution also shows that ground plane 101 edges 104 and 105 effectively increase the length of the loop and the effectiveness of the antenna 98 and increase the total radiated power in the quarter-wavelength resonant mode of the antenna 98.

FIG. 5 illustrates a measured return loss 500 of the second embodiment of the antenna 198 shown in FIG. 3. The following dimensions and values were used to perform the return loss measurement. Dielectric 111 is a GETEK ML200 substrate with a thickness of 1.6 mm. The size of ground planes 110 and 112 are 35 mm×50 mm and those ground planes 110 and 112 are etched on the surface of the dielectric substrate 111. The length of the third edge 113 of the cutout section 160 of the upper ground plane 112 is 10 mm. The length of the second edge 114 of the cutout section 160 of the upper ground plane 112 is 20.75 mm. The first edge 122 of the upper ground plane 112 coincides with an edge 162 of the host board 123, recognizing that in the embodiment illustrated in FIG. 3, the first edge 122 extends across the radio module ground plane 119 and perpendicularly the depth 174 of the radio module ground plane 119 to the host board 123. Host board vias 120 are used to electrically connect the top ground plane 112 to the supporting ground plane 110.

The FIG. 5 measured return loss 500 of the second embodiment of the antenna 198 further includes a dielectric 121 formed of a GETEK ML200 substrate with a thickness of 1.6 mm. The size of the wireless module 124 is 31 mm×20.75 mm. The ground planes 119 and 127 are 25 mm×20.75 mm. The length of the couple-fed grounded radiating strip 118 is approximately 18 mm. The length of the parallel segment 208 of the direct-fed radiating strip 115 is approximately 6.5 mm. The length of the perpendicular segment 210 of the direct-fed radiating strip 115 is approximately 2.5 mm. The width of the coupled-fed grounded radiating strip 118 is approximately 1.25 mm. The width of the direct-fed radiating strip 115 is approximately 0.5 mm.

The measured return loss 500 shows that the quarter-wavelength mode of the second embodiment of the antenna 198 disclosed herein in the 2.4 GHz band covers nearly 200 MHz at better than 2:1 VSWR, which is nearly twice the required bandwidth. The measured return loss also shows that the hybrid half and full-wavelength modes of the second embodiment of the antenna 198 cover nearly 2 GHz in the 5-7 GHz bands at better than 2:1 VSWR, which is 67% broader than the required 1.2 GHz bandwidth. Accordingly, that second embodiment of the antenna 198 is expected to satisfy the conditions for Wi-Fi 6E operation.

FIG. 6 illustrates the x, y and z unit vectors used to describe the orientation of the antenna in relation to its radiation pattern as referred to in the figures that follow.

FIGS. 7 and 8 illustrate the measured radiation pattern, or magnitude of the electric field emitted in different directions, for the second embodiment of the antenna 198 when excited at 2440 MHz. FIG. 7 illustrates a boresight view of a measured three-dimensional radiation pattern looking into the +z direction (referring to the x, y and z unit vectors illustrated in FIG. 6) of the antenna 198 when excited at 2440 MHz. The results illustrated in FIG. 7 indicate that the radiation pattern of the quarter-wavelength resonant mode of that embodiment of the antenna 198 is as good as a constant current short loop antenna. FIG. 8 illustrates a broadside view of a measured three-dimensional radiation pattern looking into the +x direction (referring to the x, y and z unit vectors illustrated in FIG. 6) of the antenna 198 when excited at 2440 MHz. FIG. 8 illustrates that the omnidirectional radiation pattern is as good as that of a conventional inverted-F antenna except that the direction of maximum gain is in the plane of the antenna 198 rather than perpendicular to the plane of the antenna 198 as is the case for the inverted-F antenna. FIG. 9 illustrates a measured horizontal polarization plane slice of the boresight view illustrated in FIG. 7 for the antenna 198 illustrated in FIG. 3 when excited at 2440 MHz that contains the maximum peak gain of 2.18 dBi and FIG. 10 illustrates a measured vertical polarization plane slice of the broadside view illustrated in FIG. 8 for the antenna 198 illustrated in FIG. 3 when excited at 2440 MHz that contains the maximum peak gain of 1.89 dBi.

FIG. 11 illustrates a measured three-dimensional boresight view radiation pattern looking into the +z direction (referring to the x, y and z unit vectors illustrated in FIG. 6) of the antenna 198 embodiment illustrated in FIG. 3 when excited at 5400 MHZ and FIG. 12 illustrates a measured broadside view radiation pattern looking into the +x direction (referring to the x, y and z unit vectors illustrated in FIG. 6) of the antenna 198 embodiment illustrated in FIG. 3 when excited at 5400 MHZ. Those results show an example of an intermediate resonant mode of the present invention. At 5400 MHZ, the present invention exhibits more directionality resulting from multiple transitioning nulls in the current distribution around the loop antenna 198. Despite increased directionality, the pattern is still considered omnidirectional.

FIG. 13 illustrates a measured vertical polarization plane slice of the boresight view illustrated in FIG. 11 for the antenna 198 illustrated in FIG. 3 when excited at for the antenna 198 illustrated in FIG. 3 when excited at 5400 MHz that contains the maximum peak gain of 3.49 dBi and FIG. 14 illustrates a measured horizontal polarization plane slice of the broadside view illustrated in FIG. 12 for the antenna 198 illustrated in FIG. 3 when excited at 5400 MHz that contains the maximum peak gain of 2.97 dBi. FIG. 15 illustrates a measured three-dimensional boresight view of the radiation pattern looking into the +z direction (referring to the x, y and z unit vectors illustrated in FIG. 6) of the antenna 198 embodiment illustrated in FIG. 3 when excited at 6000 MHz and FIG. 16 illustrates a measured three-dimensional broadside view radiation pattern looking into the +x direction (referring to the x, y and z unit vectors illustrated in FIG. 6) of the antenna 198 embodiment illustrated in FIG. 3 when excited at 6000 MHz. Those results show an example of an intermediate resonant mode of the present invention. At 6000 MHz, the present invention exhibits more directionality resulting from multiple transitioning nulls in the current distribution around the antenna 198. Despite increased directionality, the pattern is still considered omnidirectional.

FIG. 17 illustrates a measured horizontal polarization plane slice of the boresight view illustrated in FIG. 15 that contains the maximum peak gain of 0.98 dBi.

FIG. 18 illustrates the measured vertical polarization plane slice of the broadside view illustrated in FIG. 16 that contains the maximum peak gain of 2.85 dBi.

FIGS. 19-22 illustrate the measured radiation pattern of the second embodiment of the antenna 198 when excited at 7000 MHz. The resulting radiation pattern illustrated indicates that the radiation pattern of the third harmonic of the quarter-wavelength resonant transitions back to a more conventional omnidirectional pattern. As the antenna 198 transitions to its third harmonic, the radiation pattern has two additional nulls and has slightly more directionality than that of the quarter-wavelength resonant mode, but still exhibits an omnidirectional pattern similar to that of the quarter-wavelength resonant mode illustrated in FIG. 5.

FIG. 19 illustrates a measured three-dimensional boresight view radiation pattern looking into the +z direction (referring to the x, y and z unit vectors illustrated in FIG. 6) of the antenna 198 when excited at 7000 MHz.

FIG. 20 illustrates a measured three-dimensional broadside view radiation pattern looking into the +y direction (referring to the x, y and z unit vectors illustrated in FIG. 6) of the antenna 198 when excited at 7000 MHz.

FIG. 21 illustrates a measured horizontal polarization plane slice of the boresight view illustrated in FIG. 19 that contains the maximum peak gain of 2.49 dBi.

FIG. 22 illustrates a measured vertical polarization plane slice of the broadside view illustrated in FIG. 20 that contains the maximum peak gain of 1.73 dBi.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided that come within the scope of the appended claims and their equivalent.

What is claimed is:

1. A proximity-coupled loop antenna, comprising:
- a dielectric substrate;
- a ground plane situated on the dielectric substrate, the ground plane cut to form a first edge, a second edge adjacent to the first edge, a direct-fed angled strip, and an angled coupling strip, the first and second edges of the ground plane having a total length of approximately one-quarter wavelength of the lowest resonant frequency of the antenna and forming a conductive resonant edge;
  - the direct-fed angled strip extending from the first edge of the ground plane having an angled segment that is parallel to the first cut edge of the ground plane directed toward the second cut edge of the ground plane;
  - one of a signal and a radio frequency port connected to the ground plane in the direct-fed angled strip; and
  - an angled coupling strip extending from the first edge of the ground plane, the angled coupling strip adjacent to and not connected to the direct-fed angled strip, the angled coupling strip having an angled segment that is substantially parallel to the angled segment of the direct-fed angled strip, substantially parallel to the first edge of the ground plane, and directed toward the second edge of the ground plane.

2. The proximity-coupled loop antenna of claim 1, wherein the ground plane is electrically conductive and connected to ground.

3. The proximity-coupled loop antenna of claim 1, wherein the dielectric substrate acts as a resonator element.

4. The proximity-coupled loop antenna of claim 1, wherein the direct-fed angled strip has a T-shape and a base of the T-shape extends to an edge of the ground plane.

5. The proximity-coupled loop antenna of claim 1, wherein the direct-fed angled strip has an L-shape and a leg of the L-shape extends to an edge of the ground plane.

6. The proximity-coupled loop antenna of claim 1, wherein the edge of the ground plane that is substantially parallel to segments of the angled coupling strip and the direct-fed angled strip is opposite the edge of the ground plane to which the angled coupled strip and the angled direct-fed strip extend.

7. The proximity-coupled loop antenna of claim 6, wherein the first cut parallel edge of the ground plane and the second cut edge that extends from the parallel edge of the ground plane create resonance that improves the performance of the antenna.

8. The proximity-coupled loop antenna of claim 7, wherein the parallel edge of the ground plane and the edge that extends from the parallel edge of the ground plane increase radiation efficiency of the angled direct-fed strip.

9. The proximity-coupled loop antenna of claim 7, wherein the parallel edge of the ground plane and the edge that extends from the parallel edge of the ground plane effectively increases the length of the angled direct-fed strip.

10. The proximity-coupled loop antenna of claim 7, further comprising:
- a radiating strip gap between the angled direct-fed strip and the angled coupling strip; and
- a coupling strip gap between the angled direct-fed strip and the parallel edge of the ground plane.

11. A method of capturing and transmitting radio electromagnetic waves propagating through space, comprising:
- attaching a signal port to an angled direct-fed radiating strip portion of a conductive ground plane, extending from a first edge cut from the ground plane and toward a second edge cut from the ground plane, the first and second edges having a total length of approximately one-quarter wavelength of the radio electromagnetic waves;
- electrically coupling an angled coupled radiating strip, at least a portion of which is parallel to the angled direct-fed radiating strip and separated from the angled direct-fed radiating strip by a nonconductive strip, to the angled direct-fed radiating strip and the first and second edges cut from the conductive ground plane; and
- creating a capacitance between the angled direct-fed radiating strip and the first and second edges cut from the conductive ground plane, at least a portion of the first and second edges parallel to at least a portion of the angled direct-fed radiating strip.

12. The method of claim 11, further comprising forming the angled direct-fed radiating strip from the ground plane, the ground plane and angled direct-fed radiating strip located on a dielectric substrate.

13. The method of claim 12, further comprising depositing a conductive material that forms the grounding plate on the dielectric substrate.

14. The method of claim 11, further comprising forming the angled coupled radiating strip on the dielectric substrate.

15. The method of claim 11, further comprising forming the conductive edge on the dielectric substrate at an edge of the grounding plate.

16. The method of claim 11, further comprising depositing the ground plane, angled direct-fed strip, and angled coupled radiating strip on the dielectric substrate.

17. The method of claim 11, wherein the angled direct-fed strip and the angled coupling radiating strip are directed toward the second edge of the ground plane.

* * * * *